United States Patent [19]
Kumar

[11] Patent Number: 5,396,214
[45] Date of Patent: Mar. 7, 1995

[54] DYNAMIC BRAKING GRID RESISTOR CONFIGURATION FOR REDUCING EMI IN AN ELECTRIC TRACTION MOTOR VEHICLE

[75] Inventor: Ajith K. Kumar, Erie, Pa.

[73] Assignee: General Electric Company, Schenectady, N.Y.

[21] Appl. No.: 140,805

[22] Filed: Oct. 21, 1993

[51] Int. Cl.⁶ .............................................. H01C 3/00
[52] U.S. Cl. .................................. 338/279; 338/281; 338/283; 338/295; 318/376
[58] Field of Search ............... 338/281, 283, 295, 279; 318/376, 370

[56] References Cited

U.S. PATENT DOCUMENTS

3,890,551  6/1975  Plunkett ............................ 318/376
4,093,900  6/1978  Plunkett ............................ 318/370

Primary Examiner—Marvin M. Lateef
Attorney, Agent, or Firm—Ann B. Kratz; Marvin Snyder

[57] ABSTRACT

A dynamic braking grid arrangement for reducing EMI generated by dynamic or partial regenerative electrical braking of an electric traction motor powered vehicle coupled to a wayside power source by a third rail or catenary. The grid arrangement comprises a high-power dissipation resistance grid having a plurality of separately defined resistance elements, each having a generally elongate configuration. Mounting means support each of the grid elements adjacent to and parallel with each other of the elements. A plurality of electrical conduction devices connect the elements into an electrical circuit such that current passes through at least one element in a first direction and through at least one adjacent element in a second opposite direction such that EMI generated by any one element is substantially cancelled by EMI generated by an adjacent element.

6 Claims, 4 Drawing Sheets

DYNAMIC BRAKING GRID RESISTOR CONFIGURATION FOR REDUCING EMI IN AN ELECTRIC TRACTION MOTOR VEHICLE

This invention relates to electric power systems for electrically propelled and retarded vehicles and, more particularly, to a method and apparatus for reducing EMI during electrical dynamic braking of electric traction motor powered vehicles.

BACKGROUND OF THE INVENTION

Electric power conversion systems are used to condition the electric power supplied to motor load circuits from a direct current (DC) source of relatively constant voltage. If supplying DC motors, such a system will include an electric power "chopper" that is suitably controlled to vary the magnitude of load current and/or voltage as desired. Alternatively, in the case of alternating current (AC) motors, the system will include an electric power "inverter" that is suitably controlled to vary the amplitude and frequency of load voltage as desired. In either case, electric power flows from the DC source terminals to the load terminals of the controllable converter during "motoring" operation or in a reverse direction during "electrical braking".

Such a system is useful for propelling a rapid transit vehicle, in which case the source comprises a wayside conductor and the load comprises windings of at least one traction motor whose rotatable shaft is mechanically coupled through torque-increasing gearing to an axle-wheel set of the vehicle. The wayside conductor is typically energized by a relatively low voltage DC power generating plant located near the right of way along which the vehicle travels. In its motoring or propulsion mode of operation, the converter is so controlled that the DC voltage applied to its source terminals is converted into adjustable voltage at its load terminals, and the traction motor(s) responds by producing torque to accelerate the vehicle or maintain its speed as desired.

In the alternative electrical braking or retarding mode of operation of the power conversion system, the converter is so controlled that each motor acts as a generator driven by the inertia of the vehicle and supplies electric power which flows in a reverse direction through the converter and appears as direct and unipolarity voltage at the source terminals. As this electrical energy is used or dissipated, the traction motor(s) responds by absorbing kinetic energy and slowing the vehicle. Electrical braking is achieved by a combination of dynamic braking and regenerative braking. Dynamic braking is effected by connecting a dynamic braking resistance between the DC source terminals. This resistance receives current from the converter, converts the electrical energy to thermal energy, and dissipates the resulting heat. Regenerative braking, on the other hand, is effected by returning to the DC power source power flowing in a reverse direction through the converter during braking operation. These two electrical braking modes can be combined in desired proportions, this mixing process being commonly referred to as "blending".

A power conversion system including a voltage source inverter for supplying AC traction motors is disclosed in U.S. Pat. No. 3,890,551—Plunkett, assigned to General Electric Company. An important feature of the Plunkett power conversion system is its inclusion of ohmic resistance (shown at 28 in FIG. 1 of the Plunkett patent) that is inserted into the DC link between the inverter and the DC power source during electrical braking but is effectively removed from the DC link during motoring. By inserting this series resistor during electrical braking, the magnitude of voltage at the DC terminals of the inverter can increase above that of the source voltage. One of the advantages of raising the inverter voltage is to enable the traction motors to develop more magnetic flux for braking and to use less current than would otherwise be required for very high braking effort.

The power conversion system of the Plunkett patent also includes a low pass electrical filter of the conventional series inductance (L), shunt capacitance (C) type between the voltage raising resistor and the inverter for attenuating harmonics generated by operation of the inverter and for partially isolating the inverter from undesirable line transients. (As used herein, the term "harmonics" refers to various components of the composite current and voltage waveforms having frequencies that are multiples of the frequency of the fundamental component of such waveforms.) In addition, the shunt capacitance of the filter at the DC terminals of the inverter provides the "stiff" voltage required for proper operation of a voltage source inverter.

The desired blending of dynamic and regenerative braking can be accomplished in various different ways that are well known to persons skilled in the art. See, for example, U.S. Pat. No. 4,093,900—Plunkett. In the present state-of-the-art, it is preferable to replace the parallel array of separate braking resistors and their respectively associated electromechanical switches, as shown in U.S. Pat. No. 4,093,900, with a single bank of resistance elements connected to the DC link via an electric power chopper comprising a controllable solid-state electric valve that can be repetitively turned on and off in a pulse width modulation (PWM) mode to control the average magnitude of current in the resistor as desired. An example of this modern practice is disclosed in U.S. Pat. No. 4,761,600—D'Atre et al., where the electric valve comprises a main thyristor for commutating the main SCR from a conducting state (on) to a nonconducting or current blocking state (off). Alternatively, a solid-state gate turn-off device (GTO) could be substituted for the chopper shown in U.S. Pat. No. 4,761,600.

One of the primary functions of the filter capacitors, in addition to "smoothing" the DC link voltage, is to reduce certain frequencies of current which can be introduced to the wayside conductors DC power source from the propulsion system. As is well known, such wayside conductors are often positioned adjacent wayside signalling equipment in transit applications. The signalling equipment may operate at preselected frequencies, such as, for example, 25 Hz, 60 Hz, 95 Hz, 200 Hz, or such other frequency as the transit authority may select. The signalling system may be used for communication to transit vehicles operating in the system or to indicate the presence of a transit vehicle within a particular block of the transit system. Other frequencies, such as 360 Hz, 720 Hz, and 990 Hz, are used for safety checks. Because of the importance of the signals on the signalling system, it is desirable that transit vehicles not generate signals in their respective propulsion systems which might interfere with the signalling system. To this end, the values of the capacitance means and the inductance means in the power filter circuit are selected to avoid oscillations or ringing at signalling frequencies or harmonics of these frequencies.

Notwithstanding the use of filter circuits to reduce electromagnetic interference (EMI) which might detrimentally affect the wayside communication system, it is also desirable to attempt to reduce the generation of such EMI at its source. As discussed above, one significant source of EMI is traceable to high currents in the dynamic braking grid resistance during electrical retarding of the vehicle. Modulation of these currents by turning choppers on and off produces harmonic currents in the resistance grids. The flux fields produced by these harmonic currents induce corresponding currents in the wayside conductors and rails which can interfere with wayside signaling systems. Accordingly, it is desirable to provide a method and apparatus to minimize induced currents in wayside conductors and rails.

SUMMARY OF THE INVENTION

The above and other desirable features are attained in a dynamic braking circuit in which a dynamic braking resistor comprises a braking grid having individual resistive grid elements interconnected in a manner to reduce electromagnetic interference generated by high currents flowing through the grid elements. In one form, the dynamic braking grid comprises a pair of stacks of grid elements with each stack comprising two layers and with each layer comprising at least a pair of parallel arranged grid elements. The two stacks of grid elements are assembled on a mounting frame and attached in an end-to-end relationship. A plurality of electrical conduction devices are interconnected between selected ones of the grid elements so as to form a continuous current path through all of the grid elements in such a manner that current through elements of the grid in one direction are matched by currents through others of the elements of the grid in an opposite direction. In a preferred form, current passes through one grid element in each layer of each stack in a first direction and subsequently passes through the other grid element of each layer of each stack in an opposite direction. In another form, at least some of the grid elements are connected in parallel with adjacent other grid elements connected in parallel such that current through a first parallel pair produces flux which is matched by current in an opposite direction through an adjacent parallel pair.

BRIEF DESCRIPTION OF THE DRAWINGS

For a better understanding of the present invention, reference may be had to the following detailed description taken in conjunction with the accompanying drawings in which.

DETAILED DESCRIPTION OF THE INVENTION

Figure 1:
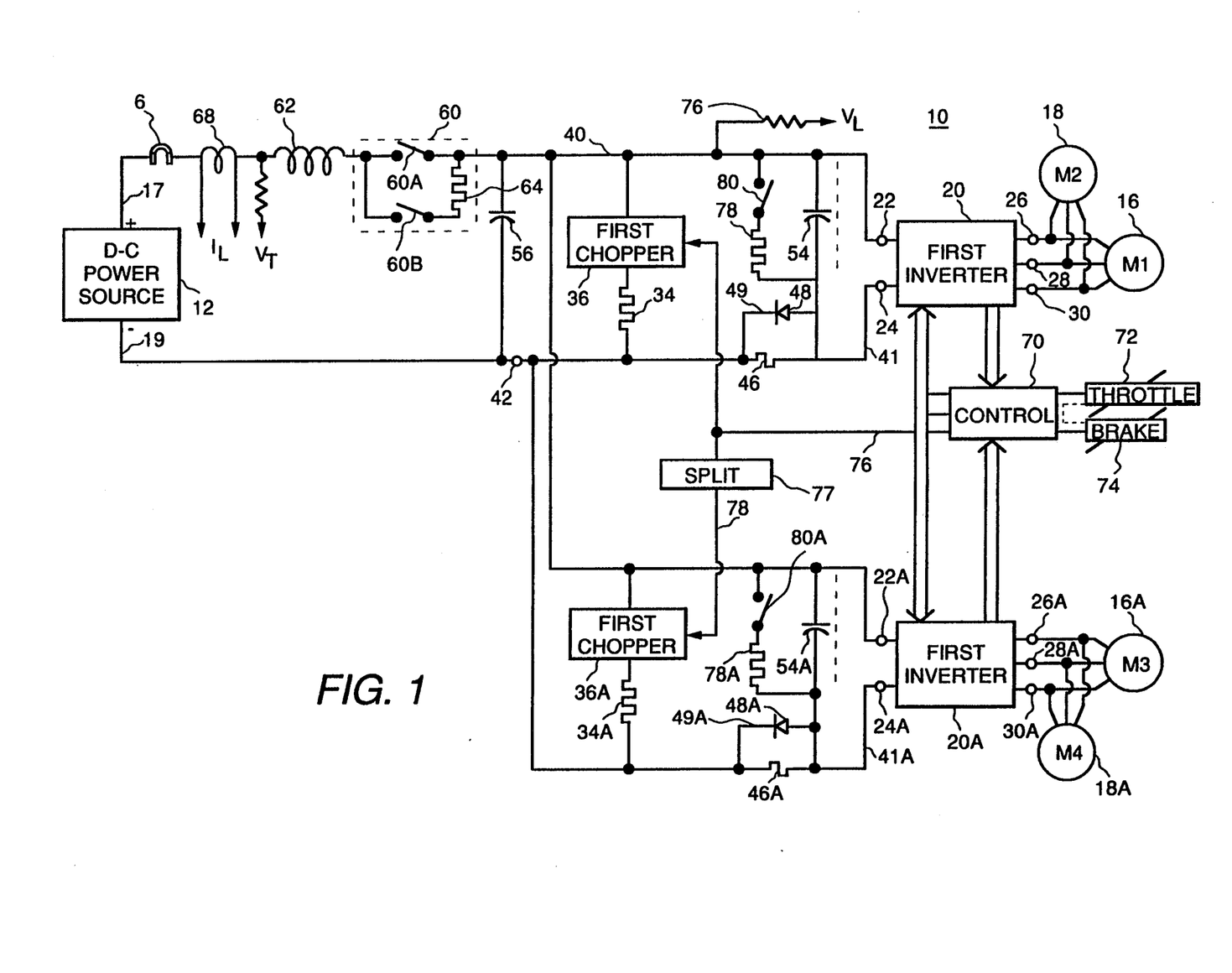
FIG. 1 is an electrical schematic diagram of one form of electric power conversion circuit with which the present invention may be used.

In order to generate an understanding of the present invention, reference is first made to FIG. 1, which shows a power conversion system 10, including a dynamic braking circuit, for conveying power between a DC power source 12 and an electric load comprising first and second motors 16 and 18 electrically connected in parallel. The motors 16 and 18 are three-phase AC induction-type traction motors used for propelling a transit vehicle (not shown), and the DC source 12 comprises a wayside power distribution system including either a third rail or an overhead catenary with which a current collector on the vehicle makes sliding or rolling contact. In FIG. 1, the relatively positive line 17 represents such a current collector, and the negative line 19 represents a conductor in contact with a grounded rail serving as the other terminal of the DC source. Alternatively, the power conversion system 10 on board the vehicle may be connected to the source via a two-wire trolley in contact with two parallel conductors of an overhead catenary. The magnitude of the unipolarity voltage between the lines 17 and 19 is typically in a range from 600 volts normal to 800 volts maximum, and each of the motors 16 and 18 typically has a full-load rating on the order of 300 horsepower more or less.

The power conversion system 10 includes a controllable converter 20 which, in the illustrated embodiment, is a voltage source inverter having a pair of DC terminals 22 and 24 on its source side and a set of three AC terminals 26, 28, and 30 on its motor side. The DC terminal 22 is connected via a conductor 40 to the lines 17 of the positive potential, and the terminal 24 is connected via relatively negative conductors 41 and 42 to the other lines 19 of the DC power source 12. The conductors 40–42 thus serve as a DC link between the source 12 and the inverter 20. The AC terminals 26, 28, and 30 are respectively connected to the three different phases of each of the AC motors 16 and 18.

During motoring, i.e., when electrical power is being conveyed from the source to the motors, direct current is supplied to the inverter through its DC terminals 22 and 24, and the inverter acts to convert this direct current into alternating current supplied through AC terminals 26, 28, and 30 to the motors 16 and 18. The inverter is of a conventional design and includes suitable controls (not shown in FIG. 1) for varying the amplitude and frequency of the alternating voltage at its AC terminals to provide the needed acceleration or deceleration of the vehicle driven by the motors 16 and 18. The well known pulse width modulated (PWM) control strategy can be used. Examples of useful inverters are disclosed in U.S. Pat. Nos. 3,890,551 and 4,761,600. In modern practice, GTO devices are preferred as the main controllable electrical valves of the inverter, thereby avoiding the need for auxiliary thyristors and commutation circuits. The power conversion system 10 has alternative motoring and electrical braking modes of operation. During electrical braking, each of the motors 16 and 18 operates as an electrical generator driven by the inertia of the transit vehicle, returning power to the system 10. This return power flows through the inverter 20 in a reverse direction from the direction of flow during motoring and appears as a unipolarity voltage and direct current at the DC terminals 22 and 24.

The conversion system 10 is designed to provide for both dynamic braking and regenerative braking. Dynamic braking is effected by connecting across the conductors 40 and 42 of the DC link a dynamic braking resistance 34 through which at least some of the braking current can be made to flow, thus dissipating electric energy in the form of heat. For controlling current in the resistance 34, an electric power chopper 36 is connected in series therewith. As is well known to persons skilled in the art, the chopper 36 is a solid-state switch that can be repetitively turned on and off by suitable control means (not shown in FIG. 1) that, in one form, controls the ratio of the "on time" to the "off time" during successive intervals each of fixed duration. The average magnitude of current in the resistance varies directly with this ratio.

Regenerative braking is effected by returning reversely-flowing power to the DC source 12. During this mode of braking, braking current from the DC terminals 22 and 24 flows through the source 12 via the DC link conductors 40, 41, and 42. Regenerated power can be used for propelling other vehicles connected to the wayside conductor and then drawing power from the same source. But, as noted in U.S. Pat. No. 4,093,900, there are many instances when a power source is not receptive enough to use all of the electrical braking energy, and in such instances some energy must be dissipated in the dynamic braking resistance 34. The chopper control is able to sense such conditions and to respond by varying the on-off ratio of the chopper appropriately. One approach for controlling electrical braking is to use only the regenerative braking mode as long as the resulting braking effort is sufficient, but to blend in dynamic braking effort when regenerative braking effort drops below the desired level.

For increasing the effectiveness of the braking action, additional ohmic resistance means 46 is connected between the two negative conductors 41 and 42 on one side of the DC link so that it is in the path of current flowing from the relatively negative line 19 of the DC power source 12 and/or the dynamic braking circuit 34, 36 to the negative DC terminal 24 of the inverter during electrical braking. This resistance means 46 is shunted by a bypass circuit 49 including suitable means 48, such as the illustrated diode, for effectively removing the resistor 46 from the DC link during motoring (i.e., when current in the conductors 41 and 42 flows in the direction of arrow 47 from the negative DC terminal 24 of the inverter 20 to the negative line 19 of the source 12). The diode 48 in the bypass circuit 49 is poled, as is shown in FIG. 1, to present negligible resistance to current in the direction of the arrow 47, but during electrical braking it blocks current which now flows in an opposite direction through conductors 41 and 42, thereby forcing such current to flow through the resistor 46. By thus effectively inserting the resistor 46 into the path of braking current, the voltage developed between the DC terminals 22 and 24 of the inverter will have a substantially higher magnitude than the voltage between conductors 40 and 42 of the DC link. Consequently, the amplitude of the motor voltage will rise above the magnitude of source voltage when the motors are acting as generators during electrical braking.

Such increased voltage is highly advantageous because it enables the motors to develop more flux for braking, and very high braking effort can be obtained with less current than would otherwise be possible. In a typical transit vehicle, the peak braking power will be much higher than the maximum power for propulsion. Keeping the maximum current as low as possible during braking has the additional benefit of avoiding the need for larger diameter and more expensive solid-state electrical valves in the inverter 20. This action and its other advantages are explained in more detail in the previously referenced U.S. Pat. No. 3,890,551. It is apparent that the extra resistor 46 will always absorb a portion of the electrical braking power even when the source 12 is highly receptive and there is no current in the dynamic braking circuit 34, 36. During regenerative braking, the resistor 46 provides an additional benefit: it helps to isolate the inverter 20 from the voltage between the lines 17 and 19, which voltage may experience sudden magnitude swings in either a positive or negative direction and lasting for many milliseconds due to lightning strokes, opening and closing of line breakers, or the like. The presence of the resistor 46 gives the inverter control circuits some additional time to respond to these sudden voltage changes in a safe and controlled manner.

For attenuating harmonics generated by operation of the power conversion system 10 and for effectively isolating the system from any undesirable electrical transients in the DC power source 12, a single-stage electrical filter of the L-C type is included in the connections between the source 12 and the inverter 20. This filter comprises a series line-filter inductance means 62 connected in the path of current between the line 17 and the positive conductor 40 of the DC link, and shunt capacitance means 54, 56. The first capacitance means 54 (referred to as the DC link capacitor) spans the conductors 40 and 41 and thus is directly connected between the two DC terminals 22 and 24 of the inverter. The second capacitance means 56 (referred to as the line capacitor) spans the conductors 40 and 42 and thus is interconnected in parallel with the capacitance means 54 via a circuit that includes the additional resistor 46 and its bypass circuit 49. During motoring, the bypass circuit around the resistor 46 is in its low resistance state as described above, essentially the same voltage is applied across both of the capacitors 54 and 56, and the effective value of capacitance in the filter is the sum of the capacitance values of the capacitors 54 and 56. But during electrical braking (when braking current is flowing in a direction opposite to the arrow 47), the resistor 46 is inserted in the path of braking current between the line capacitor 56 and the DC link capacitor 54, and the voltage magnitude across the former capacitor will now be less than the voltage across the capacitor 54 by an amount equal to the voltage drop across resistor 46.

In either mode of operation, the filter serves to attenuate harmonics generated by operation of the inverter 20 so that such harmonics are isolated from the DC source 12 and will not interfere with the usual wayside signalling system. During motoring, the DC link capacitor 54 serves mainly as the required "stiff" voltage source for the inverter 20. In the electrical braking mode of operation, the line capacitor 56 serves mainly as a filter for the chopper 36, providing a temporary path for braking current during the off periods of the chopper in the dynamic braking circuit 34, 36 which, as can be seen in FIG. 1, is connected across this capacitor. In addition to attenuating chopper-generated harmonics, the filter cooperates with the resistor 46 to dampen the inverter-generated harmonics during electrical braking.

For disconnecting the power conversion system 10, an electric circuit breaker 60, applied in a conventional manner, is provided between the system and the DC power source. This circuit breaker 60 is operated by the control 70 in response to an operator's command or to fault conditions forcing the circuit breaker to an open condition. The line breaker 60 incorporates two separately controllable contactors 60A and 60B. Contactor 60A provides a direct connection between line filter inductance means 62 and the DC link conductor 40. Contactor 60B is in series with a line filter resistor 64 and provides a resistive connection between inductance means 62 and conductor 40. In operation, contactor 60B is first closed so that charging of the filter capacitance means 54, 56 occurs through resistor 64 in order to limit initial current since the capacitance means appears as a short-circuit at power turn-on. Once the capacitance means 54, 56 has charged to substantially the value of the power source 12, the contactor 60A is closed and shunts the resistor 64. Typically, the resistor 64 may have a value of about 1.04 ohms.

In the illustrative system of FIG. 1, the closed contactor 66 represents a current collector in sliding contact with a wayside conductor. The contactor 66 may be a pantograph for an overhead conductor or a spring biased shoe for contacting a third rail.

Current to the propulsion system is monitored by a current monitor 68 of a type well known in the art. Monitor 68 generates a signal $I_L$ representative of the magnitude and frequency of current in the DC conductor 40. The voltage at DC link conductor 40 is indicated by signal $V_L$ obtained through buffer resistor 76 connected to conductor 40.

The filter capacitance means 54, 56 can be discharged through discharge resistance means 78 via discharge contactor 80. The discharge of capacitance means 54, 56 may be desirable for safety during maintenance.

In a typical transit vehicle, there will be a second voltage source inverter, in addition to the inverter described above, for supplying alternating current to two more traction motors for propelling the vehicle. FIG. 1 illustrates a power conversion system including such an additional inverter and with third and fourth AC motors being connected to the set of the AC terminals on its motor side. Components common to those described above are designated by the same reference numerals plus the suffix "a".

The positive DC terminals 22a on the source side of the second inverter 20a is connected, via the conductor 40 of the DC link, to the line 17 of positive potential, and the relatively negative DC terminal 24a is connected, via a separate conductor 41a and the common conductor 42, to the other line 19 of the DC power source 12. The AC terminals 26a, 28a, and 30a of the inverter 20a are respectively connected to three different phases of each of the AC motors 16a and 18a. A second DC link capacitor 54a individually associated with the inverter 20a, is directly connected between the DC terminals 22a and 24a, and a line capacitor 56 shared by both of the inverters 20 and 20a and both of the choppers 36 and 36a spans the conductors 40 and 42 of the DC link capacitors 54 and 54a during the motoring mode of operation of the conversion system.

As is shown, a second dynamic braking circuit, comprising the series combination of another dynamic braking resistor 34a and a second electric power chopper 36a, is connected between the DC link conductors 40 and 42 and hence across the line capacitor 56. A second additional ohmic resistance means 46a bypassed by a diode 48a is connected in the path of current between the capacitors 54a and 56. The diode 48a is poled to conduct DC link current during motoring, thereby effectively short circuiting the resistor 46a. But, it blocks current during electrical braking so that the resistor 46a is then inserted in the braking current path and causes a substantially higher voltage to develop across the DC link capacitor 54a than across the line capacitor 56. As before, the current path between the capacitors 54a and 56 is characterized by the absence of appreciable inductance.

In addition to sharing the common shunt line capacitor 56, the two inverters 20 and 20a utilize the same series line-filter inductance means 62 which is connected on the DC power source side of the capacitor 56 between the DC link conductor 40 and the line 17.

The two inverters 20 and 20a are controlled from a common control means 70 which responds to alternative command signals from interlocked throttle and brake controllers 72 and 74, respectively. The control means 70 also receives feedback signals representative of sensed values of voltage, current, and other selected variables in each of the inverters 20 and 20a. To operate in a dynamic braking mode, the control means 70 derives a train of suitably timed periodic signals that determine the repetitive on and off intervals of the choppers 36 and 36a, and it varies the ratio of these intervals as desired. This signal train is fed over a line 76 to the first chopper 36 and also to suitable means 77 for splitting it into a separate train of periodic signals that are displaced from the signals of the original train on the line 76 by a length of time corresponding to approximately one-half the period of such signals. The separate signal train is fed over a line 78 to the second chopper 36a. In this manner, the two choppers are coordinated so as to operate alternately rather than in unison. That is, the "on" periods of chopper 36a are staggered in time with respect to the "on" periods of chopper 36. This staggering reduces the amplitude and increases the frequency of the braking current traversing the line capacitor 56, thereby making it much easier for this capacitor, which is then acting as a filter for attenuating the harmonics generated by operation of both of the choppers, to perform its filtering function.

As previously discussed, it is critical to the operation of the propulsion system for transit vehicles that frequencies corresponding to signalling frequencies not be induced into the input power system 12 by the propulsion system. Continuous monitoring of the line current $I_L$ by the control 70 is utilized to assure that such signal frequencies are not present in line current.

Notwithstanding the above described system which is intended to prevent EMI generated during electrical retarding from interfering with wayside communication, the relatively high currents generated during electrical retarding (dynamic braking and partial regenerative braking) necessitate additional features to reduce EMI. Applicant has found that reduction of EMI at the braking resistors 34, 34A can be achieved by particular configurations of these resistors.

Figure 2:
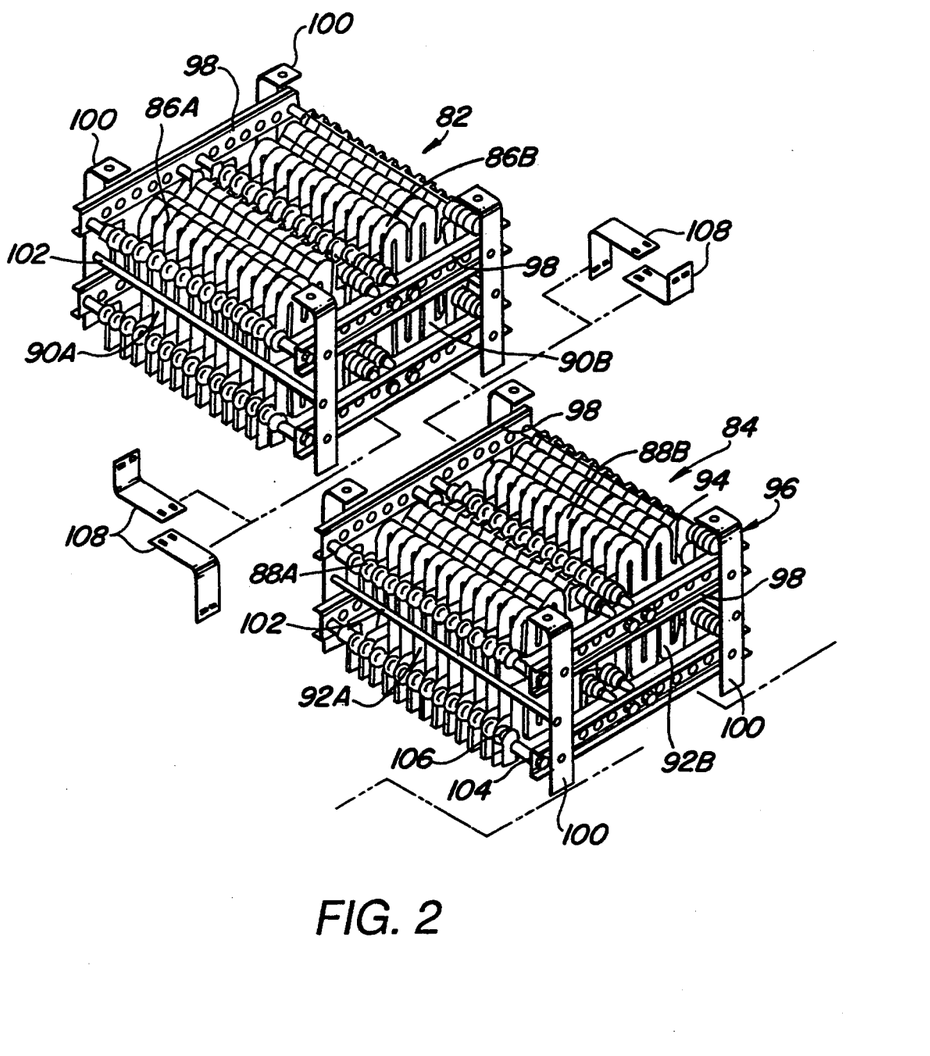
FIG. 2 is an exploded perspective view of one form of dynamic braking grid arrangement in accordance with the present invention.

Turning now to FIG. 2, there is shown an exploded perspective view of one form of dynamic brake resistor of the type used as resistor 34. Each resistor 34 is actually an assembly of grid elements. Each assembly comprises a first and a second stack 82 and 84, respectively, with each stack having an upper layer 86,88 and a lower layer 90,92. Each layer is in turn formed by a left and a right grid element, with the "A" designator representing left grid elements and the "B" designator indicating right grid elements. Each grid element 86A, 86B, for example, are formed from a plurality of stamped metal sheet units 94 having a serpentine configuration. The units 94 are welded at their ends to adjacent units to form a series resistance element of electrical length greater than the end-to-end length of the assembled units. The serpentine configuration also assists in reducing EMI since current is in opposite directions in adjacent paths.

The grid elements 86,88,90,92 are assembled in a mounting frame 96 comprising opposite pairs of end cross-members 98 attached to vertical supports 100. Bars 102 extending end-to-end of the stacks 82,84 are attached to the supports 100 and hold the stacks in compression. Insulating rods 104 with spacers 106 extend between the cross-members 98 on each side of the grid elements such that the spacers 106 are positioned to maintain separation between each adjacent ones of the sheet units 94.

Frame members (not shown) are generally bolted to the vertical supports 100 to establish the stacks 82,84 in a fixed end-to-end relationship. When assembled, brackets 108 are connected between ends of the grid elements and act as conduction devices to establish selected current paths through the elements.

Figure 3:
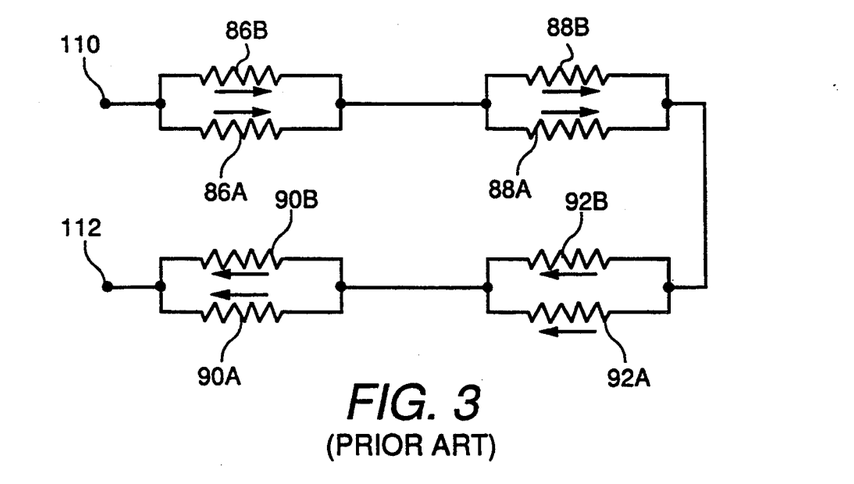
FIG. 3 illustrates a prior art circuit arrangement of the grid elements of FIG. 2.

Referring now to FIG. 3, there is shown an electrical schematic diagram of a typical prior art arrangement of the braking resistor grid elements of FIG. 2 into an electrical braking resistor corresponding to the resistor 34 of FIG. 1. The current, the conventional current direction being indicated by the arrows, enters the resistor 34 at the terminal 110 which would be connected to the chopper circuit 36. Current exits the resistor at the terminal 112 which would be connected to the DC power source return line 19. In the typical arrangement, the upper left and right grid elements 86A, 86B are connected in electrical parallel circuit arrangement and then serially connected to the upper left and right grid elements 88A and 88B in the second stack 84. Current exits the upper grid elements in the second stack and is then directed in a reverse direction through the lower left and right grid elements 92A and 92B, which are connected in electrical parallel circuit, and then through the lower left and right grid elements 90A and 90B, also connected in parallel circuit arrangement in the first stack. In this embodiment, the left and right grid elements in each layer of the grid stacks are treated as individual resistive elements and are connected in parallel with each other. Applicants have found that this particular arrangement of grid elements produces a relatively high level of electromagnetic interference. Accordingly, applicants have proposed a plurality of different electrical connections of the grid elements in order to reduce the level of electromagnetic interference produced by the braking current flowing through the grid elements.

Figure 4:
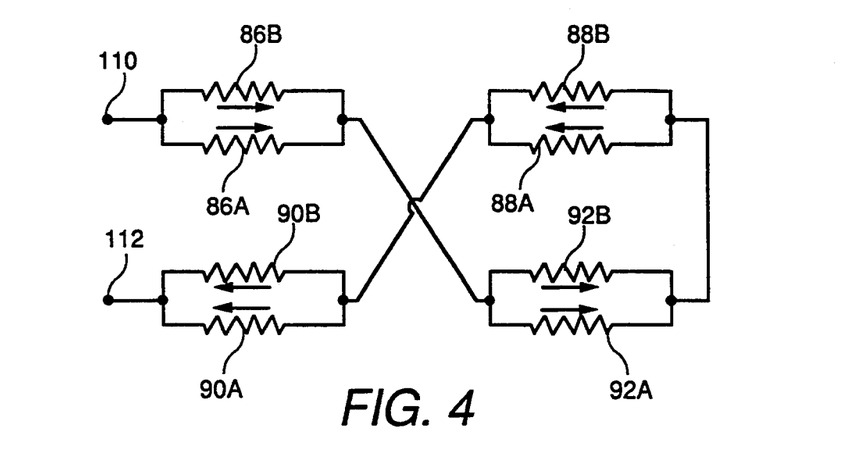
FIG. 4 illustrates an improved circuit arrangement of the grid elements of FIG. 2 for reducing EMI.

Referring now to FIG. 4, there is shown one alternate embodiment of grid element connections which has been found to reduce the level of EMI generated by the dynamic braking resistor. In the embodiment of FIG. 4, each of the grid elements and each layer of each stack are still connected in parallel circuit arrangement in the manner shown in FIG. 3, but the parallel grid arrangements are connected in series circuit in a different form. It can be seen that current enters the terminal 110 passing through the parallel combination of grid elements 86A and 86B and is then directed to the parallel combination of the lower grid elements 92A, 92B in the lower layer of the second stack 84. After exiting the lower layer 92 of stack 84, the current path is then through the parallel combination of the grid elements 88A and 88B in the upper layer of the second stack and then to the grid elements 90A and 90B connected in parallel in the lower layer of the first stack. The difference between the EMI produced in the circuit of FIG. 3 as opposed to that produced by the circuit of FIG. 4 is significantly different because the current flowing in the bottom portion of the grid element stacks produces a higher influence on the third rail or wayside power line since it is closer to the line than the grid elements in the upper layer of each stack. In FIG. 4, the current flows in opposite directions in both top and bottom layers of each stack and therefore minimizes the EMI influence on the third rail.

Figure 5:
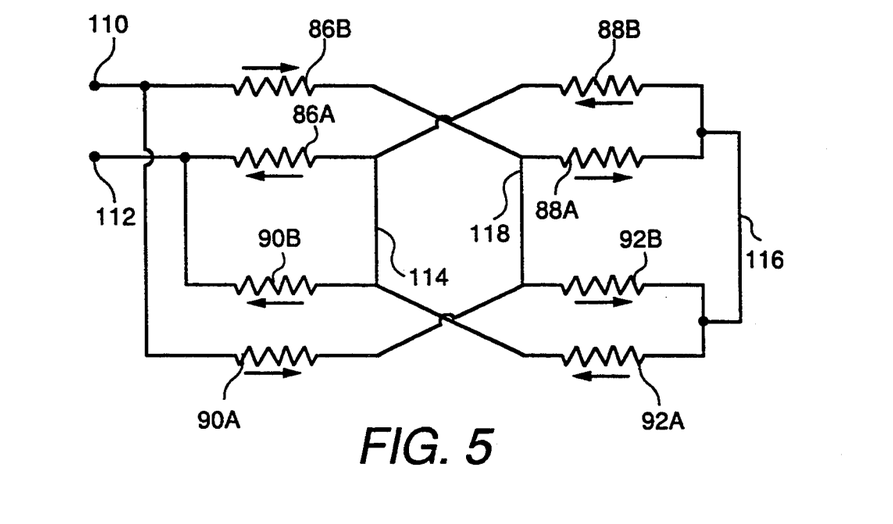
FIG. 5 illustrates an improved circuit connection for the grid elements of FIG. 2 for significantly reducing EMI.

While the circuit arrangement of FIG. 4 produced a significant improvement over the EMI levels generated by the circuit of FIG. 1, still further improvement can be obtained by utilizing the circuit connections now illustrated in FIG. 5.

In FIG. 5, the terminal 110 is connected to the upper right grid element 86B and also to the lower left grid element 90A with the two elements 86B and 90A being connected in parallel circuit arrangement by a jumper at 114. The jumper 114 also connects adjacent ends of the upper left grid element 88A and the lower right grid element 92B. The opposite ends of these grid elements 88A and 92B are jumpered by another connector 116. The jumper 116 also joins the adjacent ends of the upper right grid element 88B and lower left grid element 92A. The opposite ends of grid elements 88B and 92A are connected together by another jumper 118 which also connects adjacent ends of the upper left grid element 86A and lower right grid element 90B. The opposite ends of the grid elements 86A and 90B are connected to the terminal 112. The arrangement shown in FIG. 5 provides a current flow in adjacent elements of each layer of the two stacks which is in an opposite direction and thus provides for maximum cancellation of EMI effects.

Figure 6:
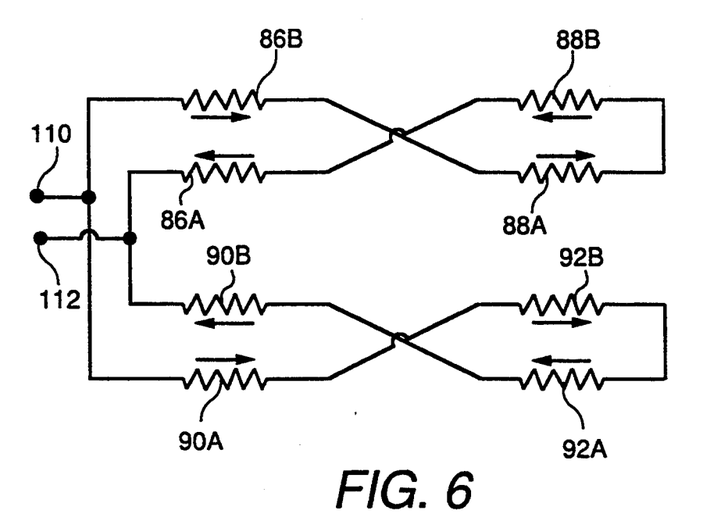
FIG. 6 is an alternate embodiment of the circuit of FIG. 5.
Figure 7:
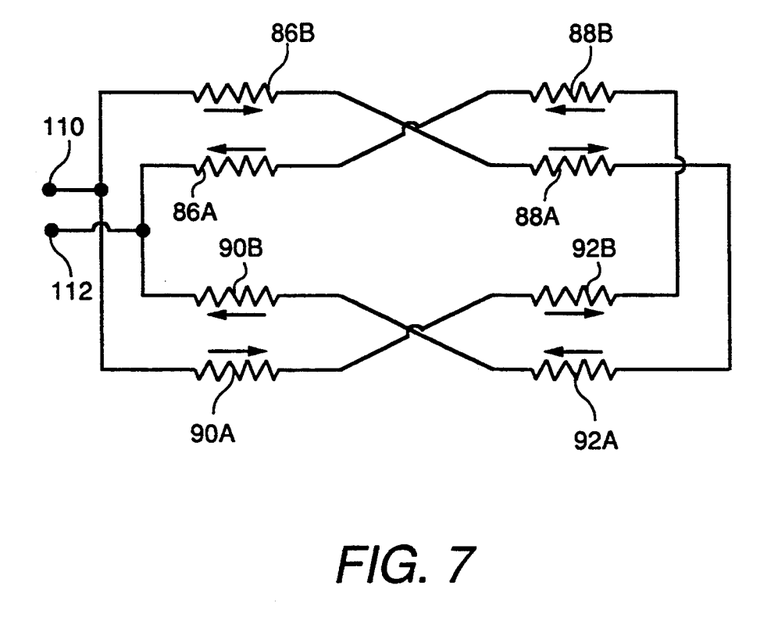
FIG. 7 is still another alternate embodiment of the circuit of FIG. 5.

Still other possible combinations of the connections of the grid elements are possible and may be found to produce satisfactory results. For example, FIG. 6 shows a connection which produces essentially the same current pattern as the arrangement of FIG. 5 but separates the upper and lower layers of each stack into separate current paths. More particularly, terminal 110 is connected to the upper right element 86B and lower left element 90A. An opposite end of element 86B is serially connected to the upper left grid element 88A in the second stack with the current path being formed by connecting the opposite end of the grid element 88A to an adjacent end of grid element 88B. 88B is then connected to upper left grid element 86A which leads current back to the terminal 112. The same pattern of connection is applied for the grid elements in the lower layers of the two stacks. As can be seen by the current indicating arrows, the direction of current through each of the grid elements is the same as in FIG. 5 and thus should produce the same degree of cancellation of induced EMI. FIG. 7 illustrates still another form of interconnecting the grid elements to produce the same direction of current through each of the grid elements as exists in FIG. 5 but allowing a crossflow of current from the upper to lower layers of each stack. In FIG. 7, terminal 110 connects to one end of grid element 86B with an opposite end of element 86B being connected to an abutting end of upper grid element 88A. The opposite end of element 88A is then connected to the adjacent end of element 92A in the lower layer of the second stack with the grid element 92A then being connected to element 90B in the lower layer of the first stack. Thus current transitions through each of the grid elements in the same direction as shown in the preferred embodiment of FIG. 5 and should thus produce a comparable effect on EMI reduction.

While the invention has been described in what is presently considered to be a preferred embodiment, various modifications and improvements will become apparent to those skilled in the art. For example, while the grid elements have been shown as a pair of stacks having a pair of layers, it will be apparent that multiple stacks, multiple layers and multiple grid elements may be used in place of the illustrated grid arrangements. It is intended therefore that the claims not be limited to the specific disclosed embodiment but be interpreted within the full spirit and scope of the invention.

What is claimed is:

1. A dynamic braking grid arrangement for reducing EMI comprising:
   a high-power dissipation resistance grid having a plurality of separately defined resistance elements, each of said elements having a generally elongate direction;
   mounting means for supporting each of said elements adjacent to and parallel with each other of said elements; and
   a plurality of electrical conduction devices adapted for connecting said elements into an electrical circuit such that current passes through at least one element in a first direction and through at least one adjacent element in a second opposite direction such that EMI generated by any one element is substantially cancelled by EMI generated by an adjacent element.

2. The grid arrangement of claim 1 wherein the grid elements are closely packed in a double stack configuration, a first stack abutting a second stack in an end-to-end orientation, each of said first and second stacks comprising at least one upper grid element overlaying and generally parallel to another lower grid element, the conduction devices being so arranged that current passes sequentially through the upper grid element in the first stack, and the lower grid element in the second stack, reverses direction passing sequentially through the upper grid element in the second stack and the lower grid element in the first stack.

3. The grid arrangement of claim 1 wherein the grid elements are closely packed in a double stack configuration having a first stack abutting a second stack in an end-to-end orientation, each of said first and second stacks comprising an upper grid segment overlaying a lower grid segment, each segment comprising at least a pair of parallel oriented left and right grid elements, said conduction devices being so arranged as to define two parallel current paths through the grid elements, a first path comprising the upper right grid element coupled in parallel circuit with the lower left grid element in the first stack and serially coupled to the parallel combination of the upper left and lower right grid elements in the second stack, the second path comprising the upper left element in parallel circuit with the lower right element in the first stack and serially coupled to the parallel combination of the upper right element and lower left element in the second stack.

4. The grid arrangement of claim 1 wherein the grid elements are closely packed in a double stack configuration having a first stack abutting a second stack in an end-to-end orientation, each of said first and second stacks comprising an upper grid segment overlaying a lower grid segment, each segment comprising at least a pair of parallel oriented left and right grid elements being so arranged as to define a first and a second current path through the grid elements, the first path comprising the upper right grid element in the first stack, coupled in series circuit with the upper left grid element in the second stack with current exiting the upper left grid element in a first direction returning through the lower left grid element of the second stack and the lower right grid element of the first stack in a second opposite direction, the second path comprising the lower left grid element of the first stack serially coupled to the lower right element of the second stack with current exiting in the first direction and reversing through the series combination of the upper right element of the second stack and upper left element of the first stack.

5. The grid arrangement of claim 1 wherein the grid elements are closely packed in a double stack configuration having a first stack abutting a second stack in an end-to-end orientation, each of said first and second stacks comprising an upper grid segment overlaying a lower grid segment, each segment comprising at least a pair of parallel oriented left and right grid elements being so arranged as to define a first and a second current path through the grid elements, the first path comprising the serial combination of the upper right element of the first stack and upper left element of the second stack with a current return through the serial combination of the upper right element of the second stack and upper left element of the first stack, the second path comprising the lower left element of the first stack serially coupled to the lower right element of the second stack with a current return through the serial combination of the lower left element of the second stack and lower right element of the first stack.

6. A dynamic braking grid arrangement for reducing EMI comprising a high-power dissipation resistance grid having a plurality of separately defined resistance elements, each of said elements having a generally elongate direction, the grid elements being closely packed in a double stack configuration, a first stack abutting a second stack in an end-to-end orientation, each of said first and second stacks comprising at least one upper grid element overlaying and generally parallel to another lower grid element, the grid elements being interconnected such that current passes sequentially through the upper grid element in the first stack, and the lower grid element in the second stack, reverses direction passing sequentially through the upper grid element in the second stack and the lower grid element in the first stack.

* * * * *